United States Patent
Ma et al.

(10) Patent No.: US 11,397,778 B2
(45) Date of Patent: Jul. 26, 2022

(54) METHOD AND DEVICE FOR MINING AN ENTERPRISE RELATIONSHIP

(71) Applicant: Beijing Baidu Netcom Science and Technology Co., Ltd., Beijing (CN)

(72) Inventors: Haishou Ma, Beijing (CN); Kai Wang, Beijing (CN); Faen Zhang, Beijing (CN); Jin Tang, Beijing (CN); Shiming Yin, Beijing (CN)

(73) Assignee: Beijing Baidu Netcom Service and Technology Co., Ltd., Beijing (CN)

( * ) Notice: Subject to any disclaimer, the term of this patent is extended or adjusted under 35 U.S.C. 154(b) by 158 days.

(21) Appl. No.: 16/286,066

(22) Filed: Feb. 26, 2019

(65) Prior Publication Data
US 2019/0370296 A1    Dec. 5, 2019

(30) Foreign Application Priority Data

May 30, 2018 (CN) .......................... 201810541062.1

(51) Int. Cl.
*G06F 16/951* (2019.01)
*G06N 20/00* (2019.01)
(Continued)

(52) U.S. Cl.
CPC ........ *G06F 16/951* (2019.01); *G06F 16/9535* (2019.01); *G06N 20/00* (2019.01); *G06Q 10/067* (2013.01)

(58) Field of Classification Search
CPC ... G06F 16/951; G06F 16/9535; G06N 20/00; G06N 5/022; G06N 7/005; G06Q 10/067
See application file for complete search history.

(56) References Cited

U.S. PATENT DOCUMENTS

| 2009/0055368 A1* | 2/2009 | Rewari ................. G06F 16/972 |
| 2012/0232955 A1* | 9/2012 | Riazzi ................ G06Q 30/0204 |
| | | 705/7.32 |

(Continued)

FOREIGN PATENT DOCUMENTS

| CN | 101853292 A | 10/2010 |
| CN | 104657750 A | 5/2015 |

(Continued)

OTHER PUBLICATIONS

First Office Action, Chinese Patent Application No. 201810541062.1, datef Apr. 27, 2020, 14 pages.

(Continued)

*Primary Examiner* — William B Partridge
*Assistant Examiner* — Aryan D Toughiry
(74) *Attorney, Agent, or Firm* — Patterson Thuente Pedersen, P.A.

(57) ABSTRACT

A method, device, apparatus and computer-readable storage medium for mining an enterprise relationship. The method can include acquiring Internet data of multiple types, identifying enterprise names from the Internet data by an enterprise name identification model, performing data mining to the Internet data in a frequent item mining algorithm to obtain relational degrees among the enterprise names, and according to the relational degrees among the enterprise names, extracting the enterprise relationship from the Internet data by an extractor. A deeper and more comprehensive enterprise relationship can be obtained by performing data mining to Internet data of multiple types by using an enterprise name recognition model. By using the frequent items mining algorithm, enterprises among which there are higher relational degrees can further be obtained, so as to obtain a more accurate enterprise relationship.

11 Claims, 5 Drawing Sheets

(51) Int. Cl.
  *G06Q 10/06* (2012.01)
  *G06F 16/9535* (2019.01)

(56) References Cited

U.S. PATENT DOCUMENTS

2014/0330860 A1* 11/2014 Yi .................. G06F 40/205
                                              707/769
2017/0011446 A1*  1/2017 Reinsberg ......... G06Q 30/0627
2018/0196881 A1*  7/2018 Lundin ............. G06N 3/0445

FOREIGN PATENT DOCUMENTS

| CN | 107103 094 A | 8/2017 |
| CN | 107247707 A | 10/2017 |
| CN | 107657032 A | 2/2018 |

OTHER PUBLICATIONS

Search Report, Chinese Patent Application No. 2018105410621, dated Apr. 16, 2020, 5 pages.

* cited by examiner

METHOD AND DEVICE FOR MINING AN ENTERPRISE RELATIONSHIP

CROSS-REFERENCE TO RELATED APPLICATION

This application claims priority to Chinese Patent Application No. 201810541062.1, filed on May 30, 2018, and entitled "Method And Device For Mining An Enterprise Relationship," which is hereby incorporated by reference in its entirety.

TECHNICAL FIELD

The present disclosure relates to a field of data mining technology, and in particular, to a method, device, apparatus and a computer-readable storage medium for mining an enterprise relationship.

BACKGROUND

An enterprise relationship, or a relationship between two or more enterprises, is very important information in an enterprise knowledge graph. The enterprise relationship plays an important role in further exploring an industry, upstream and downstream enterprises of an enterprise, monitoring risks of the enterprise and the rise and fall of the industry.

In an existing enterprise knowledge graph system, the enterprise relationship is obtained based on industrial and commercial data. However, such data only represents a simple relationship and is not deep and comprehensive.

SUMMARY

A method, device, apparatus and a computer-readable storage medium for mining an enterprise relationship are provided according to embodiments of the present disclosure, so as to at least solve the above technical problems in the existing technology.

According to a first aspect, a method for mining an enterprise relationship can include acquiring Internet data of multiple types, identifying enterprise names from the Internet data by an enterprise name identification model, performing data mining to the Internet data in a frequent item mining algorithm to obtain relational degrees among the enterprise names, and according to the relational degrees among the enterprise names, extracting the enterprise relationship from the Internet data by an extractor.

In embodiments, acquiring Internet data of multiple types can include at least one of: acquiring administrative data from a government website by a web crawler, acquiring data on news and public opinions from a news website by a web crawler, or acquiring data on public company announcements from a financial website by a web crawler.

In embodiments, the method can further include extracting a text from the Internet data by a statistical method based on a document object model tree, removing a webpage label from the text, and segmenting the text into at least one sentence according to at least one punctuation in the text.

In embodiments, identifying enterprise names from the Internet data by an enterprise name identification model can include inputting the at least one sentence into a Hidden Markov model, a deep neural network model or a condition random field model to identify the enterprise names.

In embodiments, performing data mining to the Internet data in a frequent item mining algorithm to obtain relational degrees among the enterprise names can include at least one of: by using the frequent items mining algorithm, obtaining first relational degrees among enterprise names in one text from the Internet data, by using the frequent items mining algorithm, obtaining second relational degrees among enterprise names in one paragraph of the one text from the Internet data, or by using the frequent items mining algorithm, obtaining third relational degrees among enterprise names in one sentence of the one text from the Internet data.

In embodiments the method can further include: pre-establishing an extraction rule of the extractor, wherein the extraction rule comprises the enterprise relationship corresponding to a particular relational word, and the enterprise relationship comprises at least one of an affiliation relationship, an upstream and downstream dependency, and a business relationship, or pre-establishing the extractor based on a machine learning model which is constructed in a condition random field algorithm.

According to a second aspect, a device for mining an enterprise relationship can include an acquiring module configured to acquire Internet data of multiple types, an identifying module configured to identify enterprise names from the Internet data by an enterprise name identification model, a mining module configured to perform data mining to the Internet data in a frequent item mining algorithm to obtain relational degrees among the enterprise names, and an extracting module configured to, according to the relational degrees among the enterprise names, extract the enterprise relationship from the Internet data by an extractor.

In embodiments, the acquiring module can include at least one of the following sub-modules: a first acquiring sub-module configured to acquire administrative data from a government website by a web crawler, a second acquiring sub-module configured to acquire data on news and public opinions from a news website by a web crawler, or a third acquiring sub-module configured to acquire data on public company announcements from a financial website by a web crawler.

In embodiments, the device can further comprise a pre-processing module configured to extract a text from the Internet data by a statistical method based on a document object model tree, remove a webpage label from the text, and segment the text into at least one sentence according to at least one punctuation in the text.

In embodiments, the identifying module is further configured to input the at least one sentence into a Hidden Markov model, a deep neural network model or a condition random field model to identify the enterprise names.

In embodiments, the mining module comprises at least one of the following sub-modules: a first mining sub-module configured to, by using the frequent items mining algorithm, obtain first relational degrees among enterprise names in one text from the Internet data, a second mining sub-module configured to, by using the frequent items mining algorithm, obtain second relational degrees among enterprise names in one paragraph of the one text from the Internet data, or a third mining sub-module configured to, by using the frequent items mining algorithm, obtain third relational degrees among enterprise names in one sentence of the one text from the Internet data.

In embodiments, the device can further comprise an establishing module configured to pre-establish an extraction rule of the extractor, wherein the extraction rule comprises the enterprise relationship corresponding to a particular relational word, and the enterprise relationship comprises at least one of an affiliation relationship, an upstream and downstream dependency, and a business relationship, or to pre-establish the extractor based on a machine learning model which is constructed in a condition random field algorithm.

In a third aspect, the functions of the apparatus may be implemented by hardware, or by hardware executing corresponding software. The hardware or software includes one or more modules corresponding to the above functions.

In a possible design, the apparatus for mining an enterprise relationship includes a processor and a storage, wherein the storage is configured to store a program for supporting the above mining method executed by the apparatus, the processor is configured to execute the program stored in the storage. The apparatus can further include a communication interface configured for communication between the apparatus and another apparatus or communication network.

In a fourth aspect, a computer-readable storage medium is provided for storing computer software instructions used by the apparatus, the computer software instructions include programs involved in execution of the above method.

The technical solutions provided by embodiments of the present disclosure can provide a number of advantages or beneficial effects. One benefit is that a deeper and more comprehensive enterprise relationship can be obtained by perform data mining to Internet data of multiple types by an enterprise name identification model. For example, an affiliation relationship, an upstream and downstream dependency, a business relationship, or the like can be obtained by data mining. By using the frequent item mining algorithm, the enterprise relationship with a higher relational degree can further be obtained by data mining, so as to obtain a more accurate enterprise relationship.

Another benefit is that an enterprise knowledge graph can be effectively enriched by the deep and comprehensive enterprise relationship and a relation network on enterprises can be obtained, which plays an important role in monitoring risks of enterprises and the rise and fall of the industry.

The above summary is for the purpose of the specification only and is not intended to be limiting in any way. In addition to the illustrative aspects, embodiments, and features described above, further aspects, embodiments, and features of the present disclosure will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present disclosure and are not to be considered as limiting the scope of the present disclosure.

Figure 1:
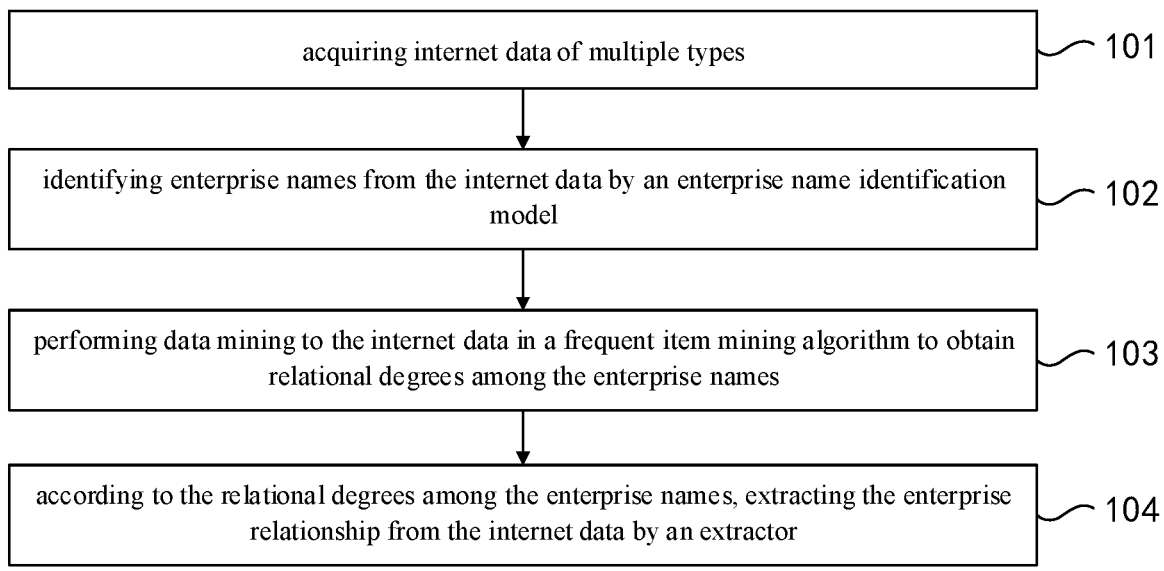
FIG. 1 shows a flowchart of a method for mining an enterprise relationship, according to an embodiment of the present disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

In the following, only certain example embodiments are briefly described. As those skilled in the art would realize, the described embodiments may be modified in various different ways, all without departing from the spirit or scope of the present disclosure. Accordingly, the drawings and description are to be regarded as illustrative in nature and not restrictive.

FIG. 1 shows a flowchart depicting a method for mining an enterprise relationship according to an embodiment of the present disclosure. At 101, acquiring Internet data of multiple types can be acquired. At 102, enterprise names can be identified from the Internet data through the use of an enterprise name identification model. At 103 data mining can performed on the Internet data in a frequent item mining algorithm to obtain relational degrees among the enterprise names. At 104, the enterprise relationship can be extract from the Internet data according to the relational degrees among the enterprise names by an extractor.

In an embodiment of the present disclosure, supported enterprises can include, but are not limited to, an individual proprietorship, a partnership, an enterprise of other types, and the like. Data in various websites on Internet includes a variety of kinds of information regarding enterprises. A web crawler can be used to crawl Internet data of multiple types from the various websites. Structured data and/or unstructured data may be included in the Internet data of multiple types. The structured data includes data crawled from a particular website, for example, from a national industrial and commercial database. The unstructured data may include data crawled from various websites on the Internet.

In one possible implementation, at 101 at least one of the following can occur. Acquiring administrative data from a government website by a web crawler, acquiring data on news and public opinions from a news website by a web crawler, or acquiring data on public company announcements from a financial website by a web crawler.

The web crawler can acquire a number of different types of data from different sources. A government website may include, but is not limited to, a government website of a respective level, a website of a respective level of Industry and Commerce Bureau, and the like. For example, administrative data such as enterprise registration information, and enterprise credit information might be included on a website of the Industry and Commerce Bureau. The data on news and public opinions on a news website may include a news report on product release, major investments, and changes in personnel organization. The data on public company announcements on a finance website may includes but not limited to a financial report, a board resolution, regulatory information, integrity information, transaction information, and the like.

Based on the Internet data of multiple types on various websites, a more comprehensive data source can be covered, facilitating the obtaining of more comprehensive analysis of enterprise relationships. The above-mentioned government websites, news websites, financial websites and the related data are only examples, but are not intended to limit the types of websites. A specific website can be selected according to actual requirements.

Figure 2:
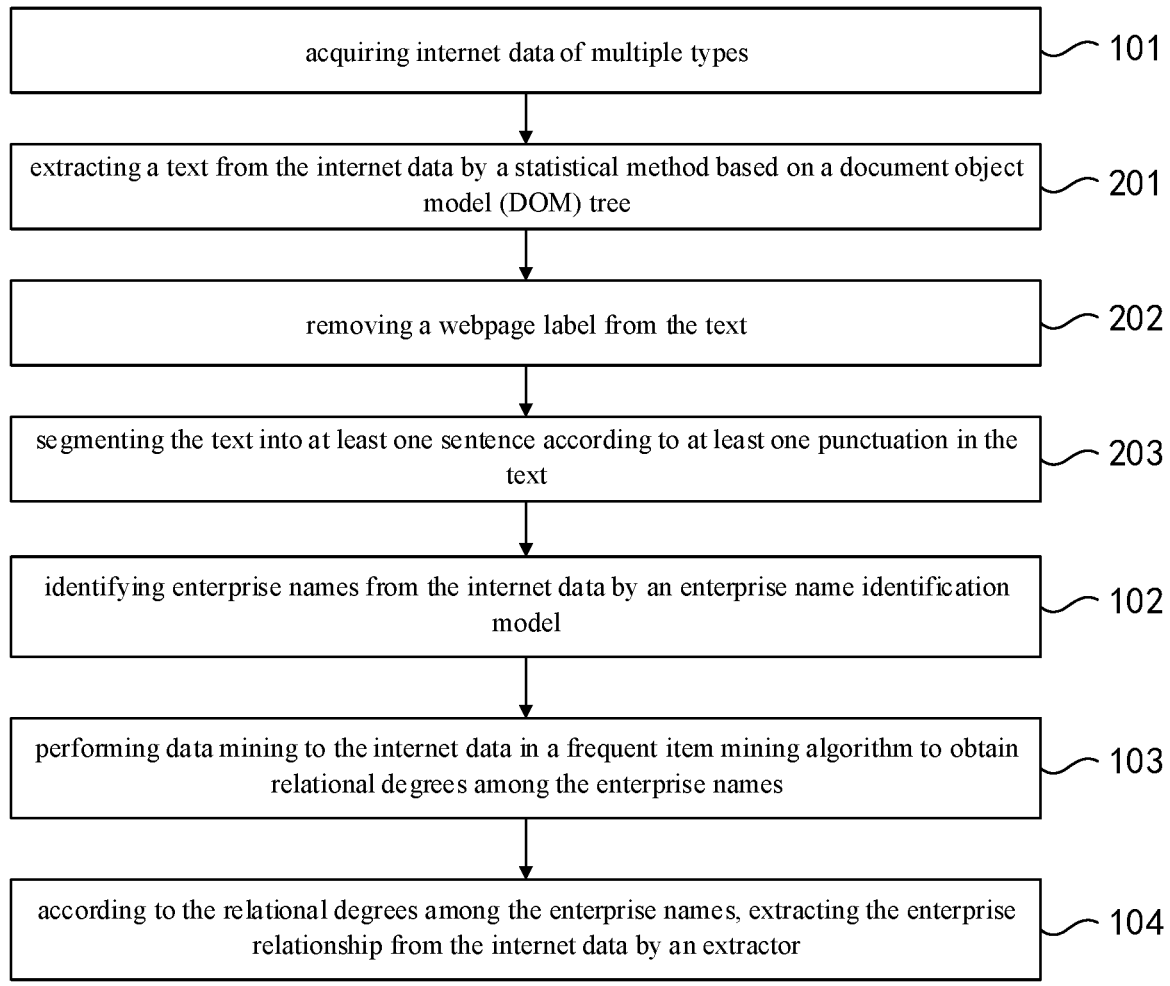
FIG. 2 shows a flowchart of a method for mining an enterprise relationship, according to an embodiment of the present disclosure.

In an embodiment, as depicted by the flowchart of FIG. 2, the method can further includes steps of pre-processing to the crawled data. For example, at 201, text can be extracted from the Internet data by a statistical method based on a document object model (DOM) tree. At 202 a webpage label can be removed from the text. At 203 the text can be segmented into at least one sentence according to at least one punctuation in the text.

Figure 3:
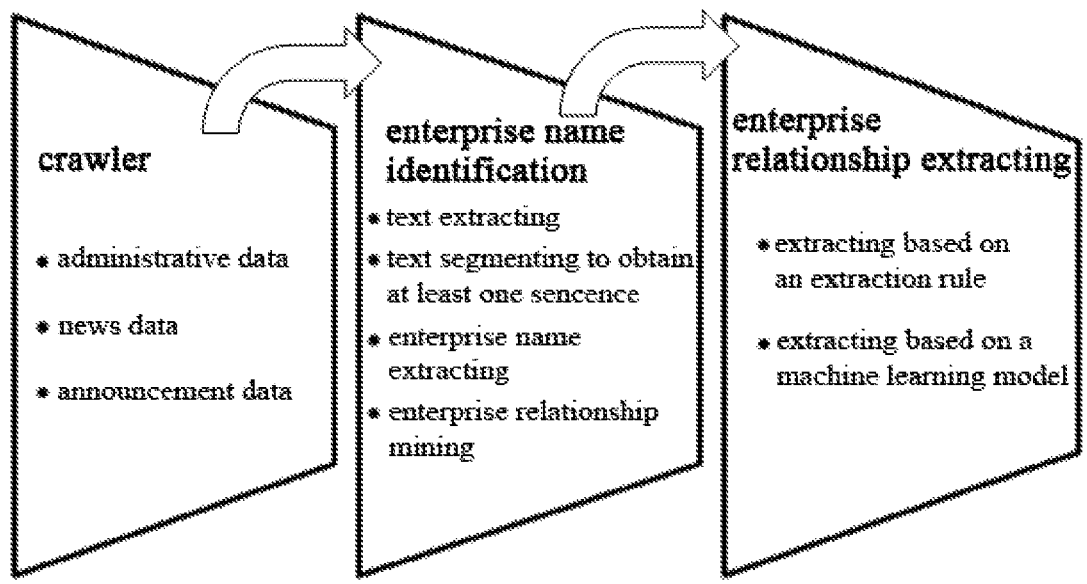
FIG. 3 is a schematic diagram of an application example of a method for mining an enterprise relationship according to an embodiment of the present disclosure.

Because there can be interference information such as a large number of advertisements and the like in the webpage, it can be helpful to extract the text from the crawled webpage. With reference to FIG. 3, the text can be extracted by a statistical method based on a DOM tree. A document of HyperText Markup Language (HTML) can be represented as a tree structure by the statistical method based on the DOM tree. The Internet data, such as the text in the webpage, can be recorded through each node in the DOM tree. The text can be segmented into at least one sentence based on at least one punctuation mark after a webpage label that is unnecessary is removed from the text, such as lines, color, symbols and the like included in the webpage template. After pre-processing of the Internet data, the interference information may be removed, which can result in reducing the amount of processing required and increasing the processing capability for the processes of name identification, frequent item mining, and relationship extracting.

In an embodiment, processing at 102 can include inputting the at least one sentence into a Hidden Markov model (HMM), a deep neural network model, or a condition random field model in order to identify the enterprise names.

The MINI is a double Markov random process. A transfer process between states in the HMM is unobservable, and the transfer process corresponds to a transferring probability matrix. A certain observation value is generated or accepted during the state transfer, which is also a stochastic process, corresponding to the outputting of a probability matrix of observation values. Therefore, the number of states N, the number of different symbols M that may be output for each state, the state transferring probability matrix, the probability distribution matrix from a state to a certain observation value, and a probability distribution of the initial state can be included in the HMM. The Hidden Markov model for identifying enterprise names can be obtained by pre-training. The at least one sentence is inputted into the MINI to identify the enterprise names.

In an embodiment, processing at 103 can include using the frequent items mining algorithm to perform at least one of obtaining first relational degrees among enterprise names in one text from the Internet data, obtaining second relational degrees among enterprise names in one paragraph of the one text from the Internet data, or obtaining third relational degrees among enterprise names in one sentence of the one text from the Internet data.

Generally, there may be close relationships among enterprise names which appear in the same article, in the same paragraph, or in the same sentence. For example, if two enterprise names appear in the same article, it indicates that there may be a relationship between the two enterprises. Therefore, based on the identified enterprise names, it is possible to determine whether a relational degree between two enterprises is high or low by performing data mining to the Internet data with the frequent item mining algorithm. Particularly, the relational degree between two enterprise names in the Internet data can be obtained according to different granularities. For example, according to the granularities of article, paragraph or sentence, relational degrees among the enterprise names may be obtained. When Company A and Company B appear in the same article, the first relational degree is 0.3; when Company A and Company B appear in the same paragraph, the second relational degree is 0.5; when Company A and Company B appear in the same sentence, the third relational degree is 0.7. When Company A and Company B appear in different articles (paragraphs, sentences) for multiple times, the relational degree between Company A and Company B can be increased.

In addition, after the frequent item mining algorithm is performed, the relational degrees among enterprises can be represented in the form of, for example, an enterprise table. For example, the correspondence between two enterprises for which the relational degree is greater than 0.5 may be saved in the enterprise table, as shown in Table 1 below. For example, all of the obtained relational degrees among enterprises may also be saved in the enterprise table.

TABLE 1

| Enterprise name | Related company | Relational degree |
| --- | --- | --- |
| A company | B company | 0.8 |
| D company | E company | 0.7 |
| L company | N company | 0.6 |

In the enterprise table, different types of relational degrees can be recorded according to different granularities, and a total relational degree can be recorded by combining relational degrees of multiple granularities and the occurrence frequency of an enterprise. The values of the above mentioned relational degree are only examples, and are not intended to limit. In actual applications, the calculation method of the relational degree may be set according to a specific scene.

In addition, data pre-processing can be performed to remove unnecessary content in the Internet data before performing the frequent item mining.

In an embodiment, the method can further include pre-establishing an extractor. With reference to FIG. 3, according to different implementations, the extractor may include an extractor based on a rule (or a template) or an extractor based on a machine learning model. Therefore, the extractor can be established by means of any one of the following modes:

In mode 1, an extraction rule of the extractor is pre-established, such that the extraction rule comprises the enterprise relationship corresponding to a particular relational word, and the enterprise relationship comprises at least one of an affiliation relationship, an upstream and downstream dependency, and a business relationship.

The respective enterprise relationships corresponding to certain specific relational words may be preset, and an enterprise relationship may be extracted based on a specific relational word appearing in the Internet data.

For example, "subsidiary" can belong to a specific relational word indicating the affiliation relationship between two enterprises, and the enterprise relationship corresponding to "subsidiary company" may include "XX is a subsidiary of XX", "XX is the parent company of XX", and "XX belongs to XX" and the like. When in a webpage, "subsidiary B of A" is included, the enterprise relationship of "B is a subsidiary of A" can be obtained.

For another example: "customer" belongs to a specific relational word indicating the business relationship between two enterprises, and the enterprise relationship corresponding to the "customer" may include "XX is a customer of XX" and the like. When "customer B of A Company" is included in a webpage, an enterprise relationship of "B is a customer of A" may be obtained.

For another example: "income information" and "payment information" in a company's financial report belong to specific relational words which represent the upstream and downstream dependence between two enterprises. According to the "income information" in the company's financial report, "information of a downstream enterprise" can be extracted. According to the "payment information" in the company's financial report, "information of an upstream enterprise" can be extracted so that the corresponding upstream and downstream dependencies can be obtained.

In mode 2, an extractor based on a machine learning model is pre-established, wherein the machine learning model can be constructed in a condition random field (CRF) algorithm.

The CRF algorithm is often used for sequence labeling problems such as syntactic analysis, named entity recognition, and part-of-speech tagging. By inputting a sentence into a machine learning model constructed by CRF algorithm, the subject, predicate and object of the sentence can be obtained by analyzing. When the subject and object are two enterprise names respectively, a predicate may indicate the enterprise relationship between the two enterprises. The enterprise relationship corresponding to the predicate can refer to the enterprise relationship corresponding to the specific relational word mentioned above.

Specifically, enterprises names among which there are high relational degrees, such as respectively greater than 0.7, can be obtained. The obtained enterprise names and related Internet data (such as the pre-processed sentences) are input into an extractor based on a machine learning model, and a more specific enterprise relationship is extracted by the extractor. For example, in-depth and comprehensive enterprise relationships, such as subsidiaries, upstream enterprises, downstream enterprises, customer relations, and involved industries of A company can be obtained.

In the method for mining an enterprise relationship in the embodiment of the present disclosure, a deeper and more comprehensive enterprise relationship can be obtained by performing data mining to Internet data of multiple types by means of an enterprise name identification model. Specifically, not only can the enterprise relationship be obtained from data crawled from a structured data, such as a data from the national industrial and commercial database, but also the enterprise relationship can be obtained from unstructured data such as public opinions, announcements and the like, which can effectively enrich a knowledge graph on enterprises and facilitate to obtain a relationship network on enterprises. For example, the involved industry, the affiliation relationship, the upstream and downstream dependency, and the business relationship of an enterprise and the like can be obtained, which plays an important role in monitoring the risks of the enterprise and the rise and fall of the industry. By using the frequent items mining algorithm, enterprises among which there are higher relational degrees can be further obtained to obtain a more accurate enterprise relationship. Embodiments of the present disclosure can be applied to, for example, a knowledge graph of an enterprise in a marketing cloud.

Figure 4:
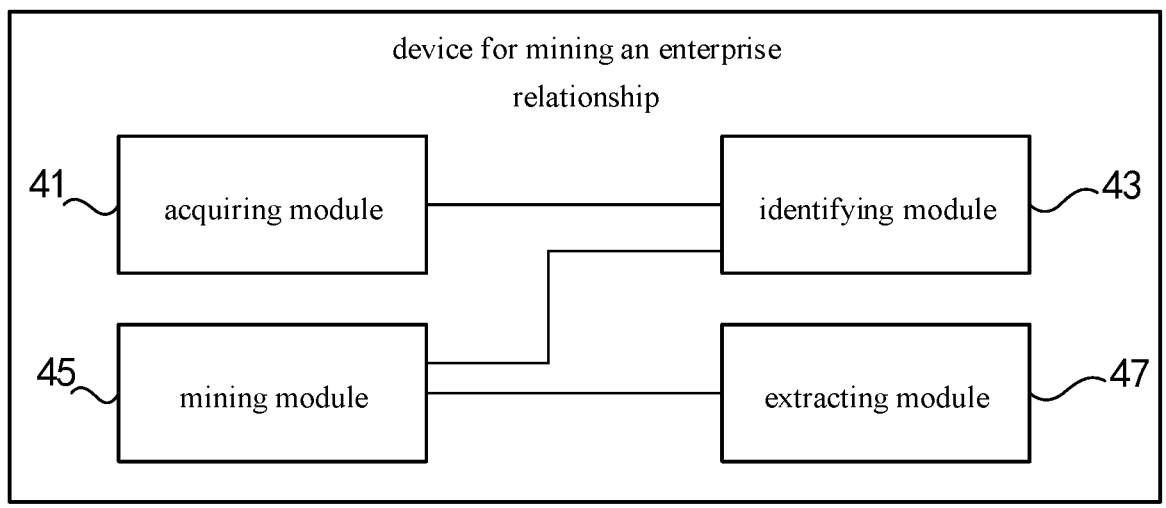
FIG. 4 is a structural block diagram of a device for mining an enterprise relationship, according to an embodiment of the present disclosure.

FIG. 4 is a structural block diagram depicting a device for mining an enterprise relationship according to an embodiment of the present disclosure. As shown in FIG. 4, the device for mining an enterprise relationship can include an acquiring module 41 configured to acquire Internet data of multiple types, an identifying module 43 configured to identify enterprise names from the Internet data by an enterprise name identification model, a mining module 45 configured to perform data mining to the Internet data in a frequent item mining algorithm to obtain relational degrees among the enterprise names, and an extracting module 47 configured to, according to the relational degrees among the enterprise names, extract the enterprise relationship from the Internet data by an extractor.

Figure 5:
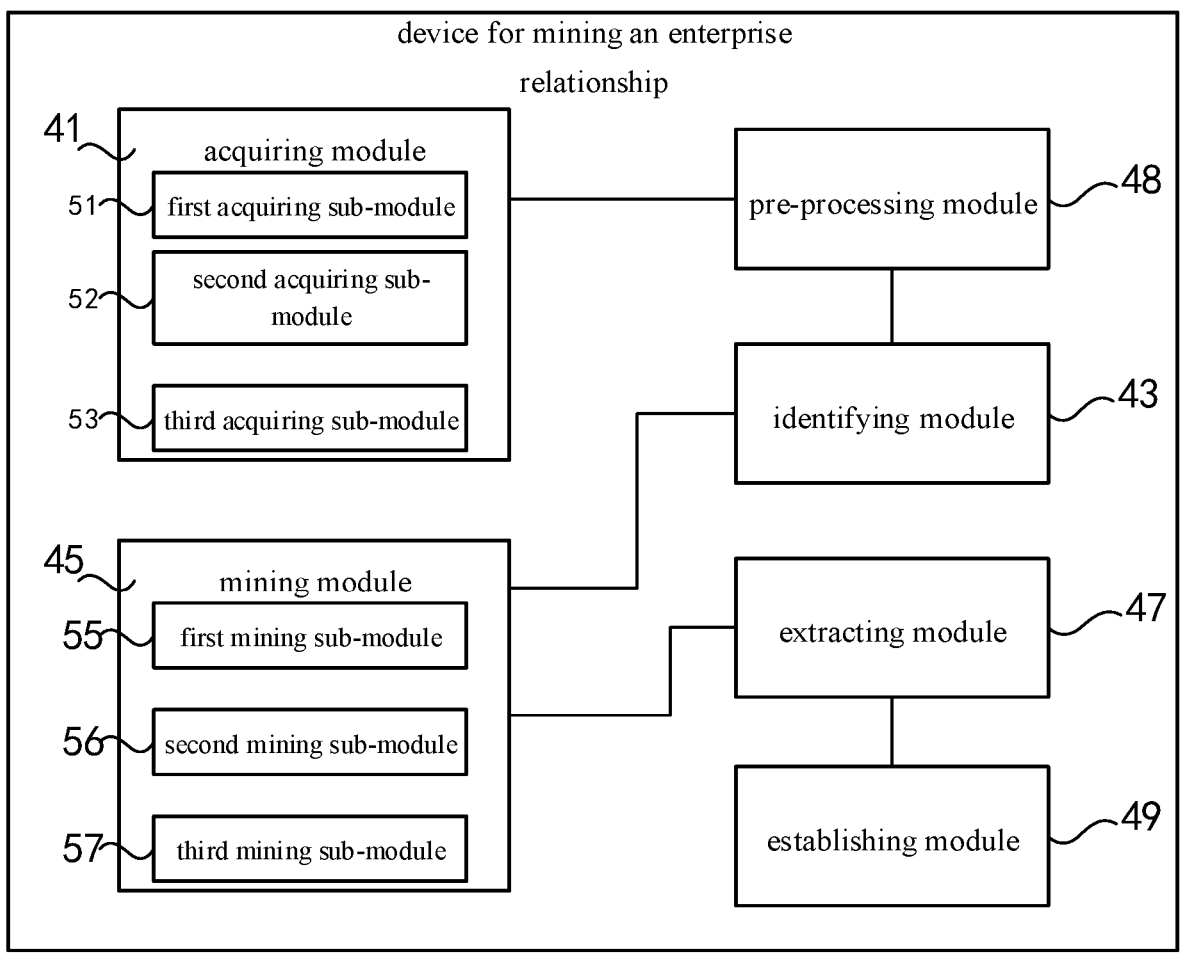
FIG. 5 is a structural block diagram of a device for mining an enterprise relationship, according to an embodiment of the present disclosure.

In an embodiment, with reference to FIG. 5, the acquiring module 41 can include at least one of the following sub-modules: a first acquiring sub-module 51 configured to acquire administrative data from a government website by a web crawler; a second acquiring sub-module 52 configured to acquire data on news and public opinions from a news website by a web crawler; or a third acquiring sub-module 53 configured to acquire data on public company announcements from a financial web site by a web crawler.

In an embodiment, the device can further include a pre-processing module 48 configured to extract a text from the Internet data by a statistical method based on a document object model tree, remove a webpage label from the text, and segment the text into at least one sentence according to at least one punctuation in the text.

In an embodiment, the identifying module 43 is further configured to input the at least one sentence into a Hidden Markov model, a deep neural network model or a condition random field model to identify the enterprise names.

In an embodiment, the mining module 45 can include at least one of the following sub-modules: a first mining sub-module 55 configured to, by using the frequent items mining algorithm, obtain first relational degrees among enterprise names in one text from the Internet data; a second mining sub-module 56 configured to, by using the frequent items mining algorithm, obtain second relational degrees among enterprise names in one paragraph of the one text from the Internet data; or a third mining sub-module 57 configured to, by using the frequent items mining algorithm, obtain third relational degrees among enterprise names in one sentence of the one text from the Internet data.

In an embodiment, the can further include an establishing module 49 configured to pre-establish an extraction rule of the extractor, wherein the extraction rule comprises the enterprise relationship corresponding to a particular relational word, and the enterprise relationship comprises at least one of an affiliation relationship, an upstream and downstream dependency, and a business relationship, or to pre-establish the extractor based on a machine learning model which is constructed in a condition random field algorithm.

In such embodiments, the functions of modules in the device refer to the corresponding description of the above mentioned methods and thus the description thereof is omitted herein.

Figure 6:
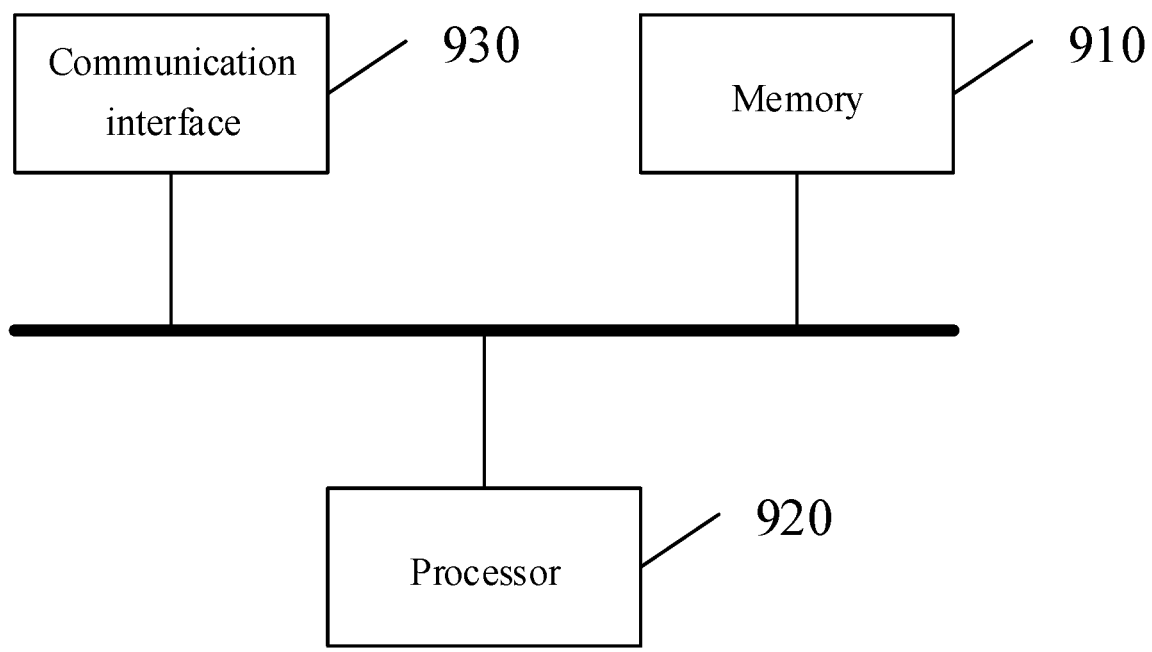
FIG. 6 is a structural block diagram of a device for mining an enterprise relationship, according to an embodiment of the present disclosure.

FIG. 6 is a structural block diagram depicting a apparatus for mining an enterprise relationship according to an embodiment of the present disclosure. As shown in FIG. 6, the apparatus for mining an enterprise relationship can include a memory 910 and a processor 920. The memory 910 stores a computer program executable on the processor 920. When the processor 920 executes the computer program, the methods for mining an enterprise relationship as discussed above are implemented. The number of memories 910 and processors 920 may be one or more. The apparatus for mining an enterprise relationship can further includes a communication interface 930 configured to communicate with an external device and exchange data.

The memory 910 may include a high-speed RAM memory and may also include a non-volatile memory, such as at least one magnetic disk memory. Where the memory 910, the processor 920, and the communication interface 930 are implemented independently, the memory 910, the processor 920, and the communication interface 930 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 6, but it does not mean that there is only one bus or one type of bus.

Optionally, in embodiments, where the memory 910, the processor 920, and the communication interface 930, are integrated on one chip, the memory 910, the processor 920, and the communication interface 930 may implement mutual communication through an internal interface.

According to an embodiment of the present disclosure, a computer-readable storage medium is provided for storing computer software instructions, which include programs involved in execution of the above the method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present disclosure. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present disclosure, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present disclosure includes additional implementations where the functions may not be performed in the order shown or discussed, including according to the functions involved, in substantially simultaneous or in reverse order, which should be understood by those skilled in the art to which the embodiment of the present disclosure belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present disclosure may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present disclosure may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present disclosure, but not intended to limit the protection scope of the present disclosure. Those skilled in the art may easily conceive of various changes or modifications within the technical scope disclosed herein, all these should be covered within the protection scope of the present disclosure. Therefore, the protection scope of the present disclosure should be subject to the protection scope of the claims.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A method for mining an enterprise relationship, comprising:
   acquiring Internet data of multiple types, the Internet data of multiple types including at least administrative data from a government website;
   identifying enterprise names from the Internet data by applying at least the administrative data to an enterprise name identification model for a respective enterprise relationship;
   performing data mining of the Internet data using at least the administrative data in a frequent item mining algorithm to obtain relational degrees among the enterprise names for the respective enterprise relationship; and
   according to the relational degrees among the enterprise names, extracting the enterprise relationship from the Internet data by an extractor;
   wherein performing the data mining of the Internet data using at least the administrative data in the frequent item mining algorithm to obtain the relational degrees among the enterprise names for the respective enterprise relationship comprises:
      by using the frequent items mining algorithm, obtaining first relational degrees among enterprise names in one text from the Internet data, and increasing the first relational degrees, in a case where the number of appearances of the enterprise names in different articles is larger than a first time threshold;
      by using the frequent items mining algorithm, obtaining second relational degrees among enterprise names in one paragraph of the one text from the Internet data, and increasing the second relational degrees in a case where the number of appearances of the enterprise names in different paragraphs is larger than a second time threshold; and
      by using the frequent items mining algorithm, obtaining third relational degrees among enterprise names in one sentence of the one text from the Internet data, and increasing the third relational degrees in a case where the number of appearances of the enterprise names in different sentences is larger than a third time threshold;
      wherein the first relational degrees are less than the second relational degrees and the second relational degrees are less than the third relational degrees.

2. The method of claim 1, wherein the administrative data from the government website is acquired by a web crawler, and acquiring Internet data of multiple types further comprises at least one of:
   acquiring data on news and public opinions from a news website by a web crawler; or
   acquiring data on public company announcements from a financial website by a web crawler.

3. The method of claim 1, further comprising:
   extracting a text from the Internet data by a statistical method based on a document object model tree;
   removing a webpage label from the text; and
   segmenting the text into at least one sentence according to at least one punctuation in the text.

4. The method of claim 3, wherein identifying enterprise names from the Internet data by an enterprise name identification model comprises:
   inputting the at least one sentence into at least one of a Hidden Markov model, a deep neural network model, or a condition random field model, to identify the enterprise names.

5. The method of claim 1, further comprising at least one of:
   pre-establishing an extraction rule of the extractor, wherein the extraction rule comprises the enterprise relationship corresponding to a particular relational word, and the enterprise relationship comprises at least one of an affiliation relationship, an upstream and downstream dependency, and a business relationship; or
   pre-establishing the extractor based on a machine learning model which is constructed in a condition random field algorithm.

6. A device for mining an enterprise relationship, comprising:
   one or more processors; and
   a storage device configured for storing one or more programs, wherein the one or more programs are executed by the one or more processors to enable the one or more processors to implement a method comprising:

acquiring Internet data of multiple types, the Internet data of multiple types including at least administrative data from a government website identifying enterprise names from the Internet data by applying at least the administrative data to an enterprise name identification model for a respective enterprise relationship;

performing data mining to the Internet data using at least the administrative data in a frequent item mining algorithm to obtain relational degrees among the enterprise names for the respective enterprise relationship; and according to the relational degrees among the enterprise names, extracting the enterprise relationship from the Internet data by an extractor;

wherein the one or more programs are executed by the one or more processors to enable the one or more process to implement the method further comprising:

by using the frequent items mining algorithm, obtaining first relational degrees among enterprise names in one text from the Internet data, and increasing the first relational degrees in a case where the number of appearances of the enterprise names in different articles is larger than a first time threshold;

by using the frequent items mining algorithm, obtaining second relational degrees among enterprise names in one paragraph of the one text from the Internet data, and increasing the second relational degrees, in a case where the number of appearances of the enterprise names in different paragraphs is larger than a second time threshold; and by using the frequent items mining algorithm, obtaining third relational degrees among enterprise names in one sentence of the one text from the Internet data, and increasing the third relational degrees, in a case where the number of appearances of the enterprise names in different sentences is larger than a third time threshold;

wherein the first relational degrees are less than the second relational degrees and the second relational degrees are less than the third relational degrees.

7. The device of claim 6, wherein the administrative data from the government website is acquired by a web crawler, and the one or more programs are executed by the one or more processors to enable the one or more processors to implement the method further comprising:

acquiring data on news and public opinions from a news website by a web crawler; or acquiring data on public company announcements from a financial website by a web crawler.

8. The device of claim 6, wherein the one or more programs are executed by the one or more processors to enable the one or more process to implement the method further comprising:

extracting a text from the Internet data by a statistical method based on a document object model tree, removing a webpage label from the text, and segmenting the text into at least one sentence according to at least one punctuation in the text.

9. The device of claim 8, wherein the one or more programs are executed by the one or more processors to enable the one or more process to implement the method further comprising:

inputting the at least one sentence into at least one of a Hidden Markov model, a deep neural network model, or a condition random field model, to identify the enterprise names.

10. The device of claim 6, wherein the one or more programs are executed by the one or more processors to enable the one or more process to implement the method further comprising:

pre-establishing an extraction rule of the extractor, wherein the extraction rule comprises the enterprise relationship corresponding to a particular relational word, and the enterprise relationship comprises at least one of an affiliation relationship, an upstream and downstream dependency, and a business relationship, or to pre-establish the extractor based on a machine learning model which is constructed in a condition random field algorithm.

11. A non-transitory computer-readable storage medium, in which a computer program is stored, wherein the computer program, when executed by a processor, causes the process to execute a method comprising:

acquiring Internet data of multiple types, the Internet data of multiple types including at least administrative data from a government website;

identifying enterprise names from the Internet data by applying at least the administrative data to an enterprise name identification model for a respective enterprise relationship;

performing data mining of the Internet data using at least the administrative in a frequent item mining algorithm to obtain relational degrees among the enterprise names for the respective enterprise relationship; and according to the relational degrees among the enterprise names, extracting an enterprise relationship from the Internet data by an extractor;

wherein when the computer program is executed by a processor to cause the process to perform the data mining of the Internet data using at least the administrative data in the frequent item mining algorithm to obtain the relational degrees among the enterprise names for the respective enterprise relationship, the computer program is executed by a processor to cause the process to specifically perform:

by using the frequent items mining algorithm, obtaining first relational degrees among enterprise names in one text from the Internet data, and increasing the first relational degrees in a case where the number of appearances of the enterprise names in different articles of the one text is larger than a first time threshold;

by using the frequent items mining algorithm, obtaining second relational degrees among enterprise names in one paragraph of the one text from the Internet data, and increasing the second relational degrees in a case where the number of appearances of the enterprise names in different paragraphs is larger than a second time threshold; and by using the frequent items mining algorithm, obtaining third relational degrees among enterprise names in one sentence of the one text from the Internet data, and increasing the third relational degrees in a case where the number of appearances of the enterprise names in different sentences is larger than a third time threshold;

wherein the first relational degrees are less than the second relational degrees and the second relational degrees are less than the third relational degrees.

* * * * *